(12) United States Patent
Peng et al.

(10) Patent No.: US 7,913,357 B2
(45) Date of Patent: Mar. 29, 2011

(54) HINGE POSITIONING STRUCTURE AND UNIT

(75) Inventors: Ying-Jun Peng, Shenzhen (CN); Jin-Xin Wang, Shenzhen (CN)

(73) Assignees: Hong Fu Jin Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 261 days.

(21) Appl. No.: 12/126,985

(22) Filed: May 26, 2008

(65) Prior Publication Data

US 2009/0144935 A1 Jun. 11, 2009

(30) Foreign Application Priority Data

Dec. 7, 2007 (CN) .......................... 2007 1 0202923

(51) Int. Cl.
*E05D 11/10* (2006.01)
(52) U.S. Cl. ............................... 16/321; 16/297; 16/308
(58) Field of Classification Search .................... 16/277, 16/297, 308, 321, 322, 324, 342; 361/679.27; 379/433.13; 455/575.3; 248/917–923
See application file for complete search history.

(56) References Cited

U.S. PATENT DOCUMENTS

| | | | | |
|---|---|---|---|---|
| 5,037,231 A | * | 8/1991 | Kitamura | 403/120 |
| 5,394,650 A | * | 3/1995 | Dean | 49/386 |
| 5,467,504 A | * | 11/1995 | Yang | 16/342 |
| 6,145,797 A | * | 11/2000 | Uehara | 248/291.1 |
| 6,354,552 B1 | * | 3/2002 | Chiu | 248/422 |
| 6,532,628 B2 | * | 3/2003 | Kim | 16/342 |
| 7,523,905 B2 | * | 4/2009 | Timm et al. | 248/284.1 |
| 2006/0219849 A1 | * | 10/2006 | Chiu | 248/125.8 |
| 2009/0008518 A1 | * | 1/2009 | Shen | 248/122.1 |
| 2009/0016006 A1 | * | 1/2009 | Stothers | 361/681 |
| 2009/0021901 A1 | * | 1/2009 | Stothers | 361/681 |
| 2010/0050383 A1 | * | 3/2010 | Wang et al. | 16/297 |

* cited by examiner

*Primary Examiner* — William L. Miller
(74) *Attorney, Agent, or Firm* — Zhigang Ma

(57) ABSTRACT

An exemplary hinge positioning structure (20) includes a pair of first leaves (22), a pivot shaft (262) rotatably engaged in the pair of first leaves, and a pair of pivot shaft grippers (24) sleeved on the pivot shaft. An end of each pivot shaft gripper engaged with each of the first leaves respectively so that the end of each pivot shaft gripper is fixed relative to each of the first leaves. The hinge positioning structure further includes a resilient member (266), two ends of the resilient member connected to the pair of pivot shaft grippers respectively, and applying a force on the pair of pivot shaft grippers so that the pair of pivot shaft grippers tightly grip the pivot shaft, such that the pivot shaft is prevented from rotating relative to the first leaves.

13 Claims, 4 Drawing Sheets

HINGE POSITIONING STRUCTURE AND UNIT

BACKGROUND OF THE INVENTION

1. Field of the Invention

The present invention relates generally to hinges, and particularly to a hinge positioning unit.

2. Discussion of the Related Art

Hinges allow two elements to rotate relative to each other. A force or pressure applied to one of the two elements facilitates this relative movement. The hinges may be designed such that the two elements are usually able to remain at the positions reached after the applied force is removed. Many devices such as notebook computers and clamshell mobile phones incorporate such hinges.

A typical hinge used in a device having a liquid crystal display screen includes a first hinge leaf and a second hinge leaf rotatably connected to the first hinge leaf. An elastic member and a plurality of washers are disposed between the first hinge leaf and the second hinge leaf. An elastic force of the elastic member makes the first hinge leaf, the second hinge leaf, and the washers abut to adjacent members. Frictional forces between the members are strong enough to prevent the members from rotating arbitrarily. When a force large enough to overcome the frictional force is imparted on the second hinge leaf, the second hinge leaf can rotate relative to the first hinge leaf.

However, when the frictional force is not strong enough, the second hinge leaf is likely to rotate relative to the first hinge leaf without the application of outside forces and may not remain at a desired position. On the other hand, when the frictional force is too strong, the second hinge leaf may rotate only on applying an excessive amount of force. In addition, when the hinge is used over a certain time, the frictional force may become smaller because of deformation of the elastic member, abrasion of the washers, or other reasons, thus the hinge cannot work.

Therefore, a new hinge positioning structure and unit to solve the above-described problems are desired.

SUMMARY

An exemplary hinge positioning structure includes a pair of first leaves, a pivot shaft rotatably engaged in the pair of first leaves, and a pair of pivot shaft grippers sleeved on the pivot shaft. An end of each pivot shaft gripper engaged with each of the first leaves respectively, so that the end of each pivot shaft gripper is fixed relative to each of the first leaves. The hinge positioning structure further includes a resilient member, two ends of the resilient member connected to the pair of pivot shaft grippers respectively, and applying a force on the pair of pivot shaft grippers so that the pair of pivot shaft grippers tightly grip on the pivot shaft, such that the pivot shaft is prevented from rotating relative to the first leaves.

An exemplary hinge positioning unit includes a pivot shaft and a pair of pivot shaft grippers. The pair of pivot shaft grippers are sleeved on the pivot shaft from two distal ends of the pivot shaft. Each of the pivot shaft grippers has a first end and a second end. The pivot shaft grippers are tightly sleeved or relaxed sleeved on the pivot shaft by pulling or relaxing the first and second ends of each of the pivot shaft grippers, thus locking or unlocking the pivot shaft.

Other advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the present hinge positioning structure and unit. Moreover, in the drawings, like reference numerals designate corresponding parts throughout the several views, and all the views are schematic.

DETAILED DESCRIPTION OF THE EMBODIMENTS

Figure 1:
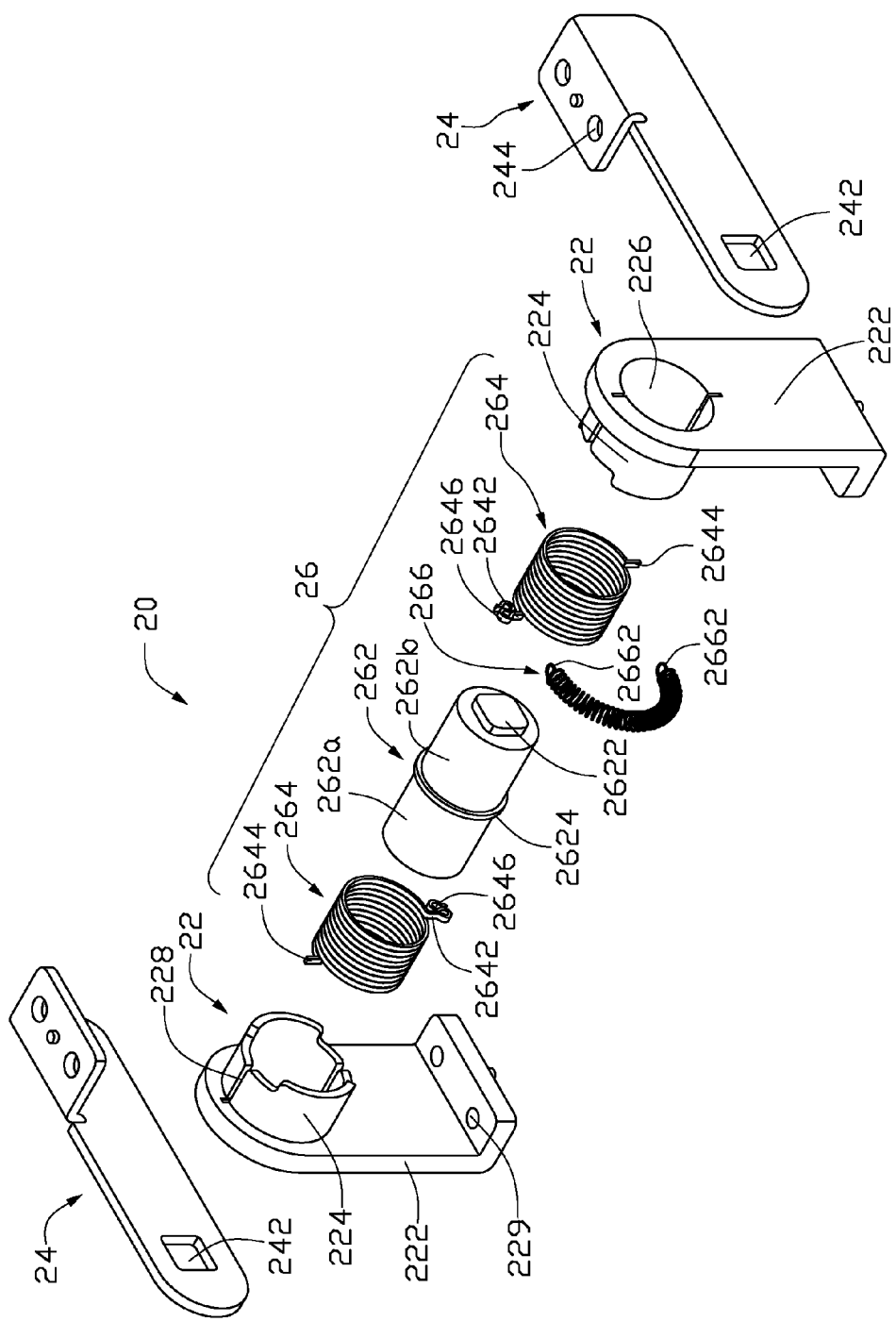
FIG. 1 is an exploded, isometric view of a hinge positioning structure in accordance with a preferred embodiment of the present invention.

Referring to FIG. 1, a hinge positioning structure 20 of a preferred embodiment includes a pair of first leaves 22, a pair of second leaves 24, and a hinge positioning unit 26. The hinge positioning unit 26 includes a pivot shaft 262, a pair of pivot shaft grippers 264, and a resilient member 266. The pair of first leaves 22, the pair of second leaves 24, and the pair of pivot shaft grippers 264 are approximately configured to be symmetrically attached to the pivot shaft 262 correspondingly, and to more clearly describe the preferred embodiment, only one of the first leaves 22, one of the second leaves 24, and one of the pivot shaft grippers 264 will be detailed.

The first leaf 22 includes a mounting portion 222 and a knuckle portion 224. The mounting portion 222 is substantially a flat sheet. The knuckle portion 224 is substantially a cylinder and an end of the knuckle portion 224 is perpendicularly connected to the mounting portion 222. That is, the knuckle portion 224 perpendicularly extends out of the mounting portion 222. The first leaf 22 further includes a circular pivot hole 226, and the circular pivot hole 226 extends through the knuckle portion 224 and the mounting portion 222. The knuckle portion 224 defines a positioning groove 228 in an inner sidewall, and the positioning groove 228 extends along a direction perpendicular to the mounting portion 222.

The second leaf 24 is a sheet defining a non-circular engaging hole 242 at an end of the second leaf 24.

The pivot shaft 262 is approximately cylindrical and forms a retaining ring 2624 around a middle portion of the pivot shaft 262. The retaining ring 2642 substantially divides the pivot shaft 262 into two symmetrical halves, a first pivot shaft 262a and a second pivot shaft 262b. Both the first and the second pivot shaft 262a, 262b have a non-circular engaging protrusion 2622 extending out of an outer end. A size and a shape of the engaging protrusion 2622 correspond to that of the engaging hole 242 of the second leaf 24. The engaging protrusion 2622 is configured to be engaged in the engaging hole 242 of the second leaf 24, such that the second leaf 24 and the pivot shaft 262 are non-rotatable relative to each other.

The pivot shaft gripper 264 is a columnar, helical, torsional spring including a plurality of spring rings (not labeled). The pivot shaft grippers 264 further includes a first end 2642 and a second end 2644 at distal ends respectively. An S-shaped hook 2646 is formed at the first end 2642. In this embodiment, a diameter of spring rings of the pivot shaft grippers 264 is larger than that of the pivot shaft 262, so that the pivot shaft grippers 264 can be sleeved on the pivot shaft 262 in a normal state. A cross section of a wire forming the pivot shaft grippers 264 is substantially rectangular. Thus, when an external force is applied to make the pivot shaft grippers 264 constricts on the pivot shaft 262, the pivot shaft grippers 264 and the pivot shaft 262 will have a larger contact area to produce frictional force.

The resilient member 266 is an extension/compression spring that can be extended and compressed. The resilient member 266 includes two rings 2662 formed at two distal ends. The two rings 2662 of the resilient member 266 are configured to connect to the first ends 2642 of the pair of pivot shaft grippers 264, correspondingly.

Figure 2:
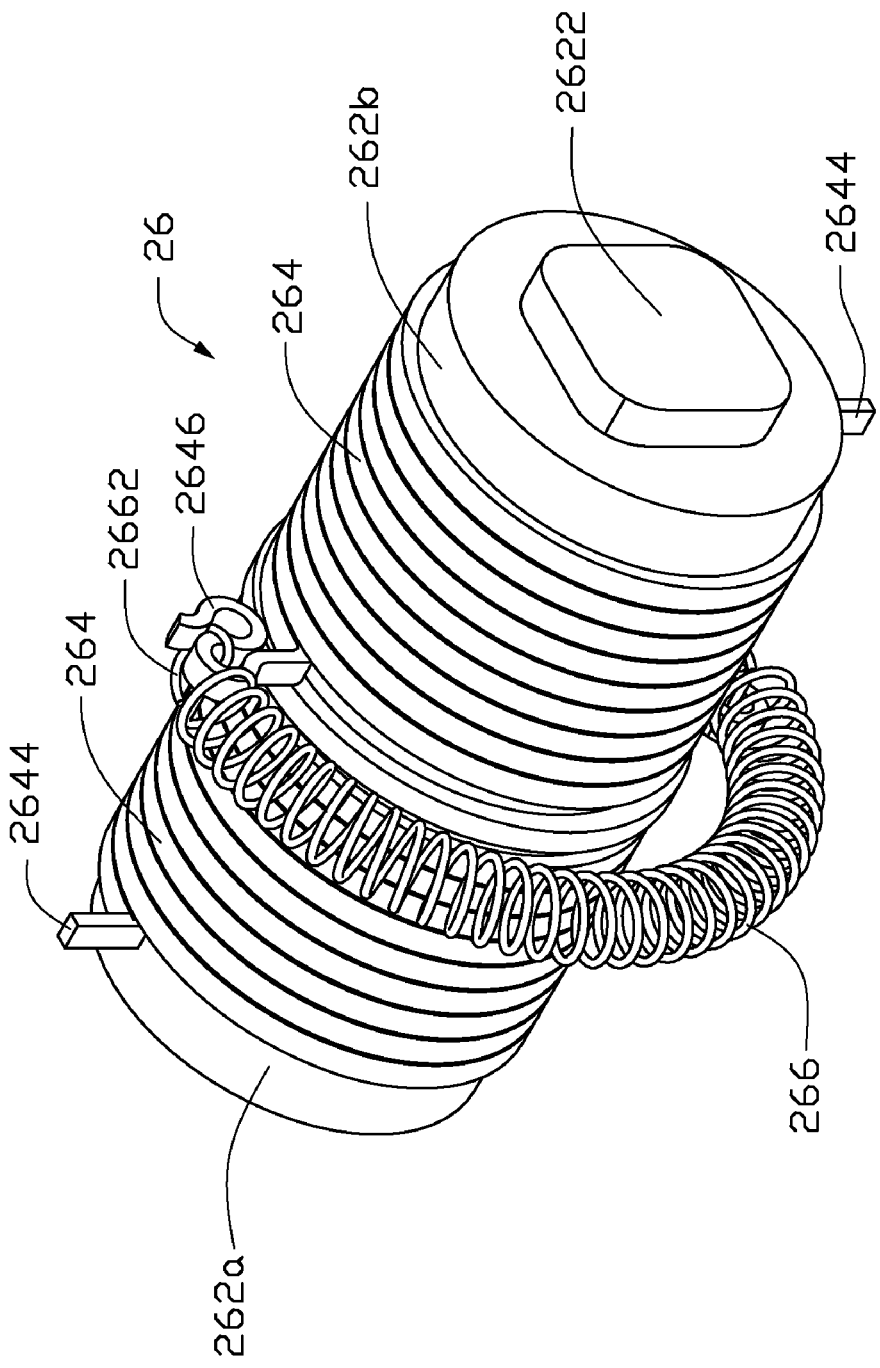
FIG. 2 is an assembled, isometric view of a hinge positioning unit of the hinge positioning structure of FIG. 1.
Figure 3:
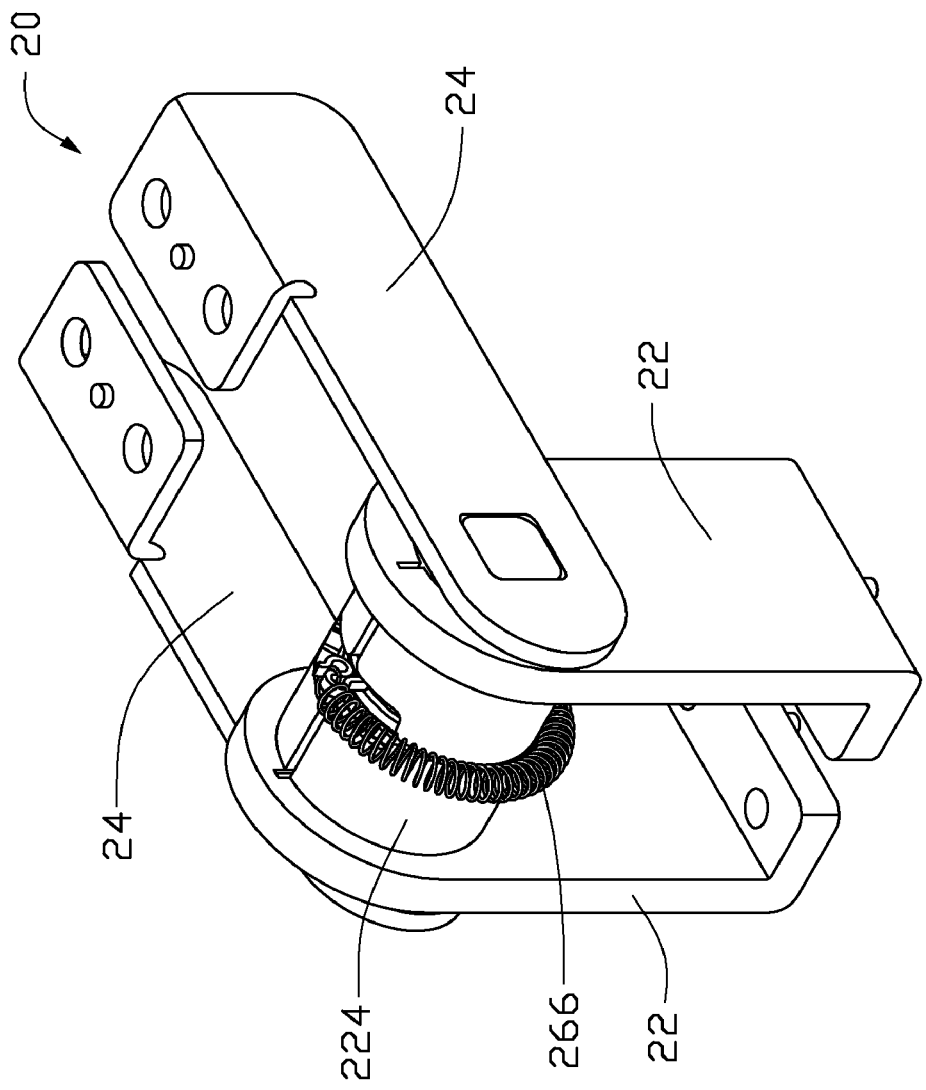
FIG. 3 is an assembled, isometric view of the hinge positioning structure of FIG. 1.

Referring to FIG. 2 and FIG. 3, a manner of assembling a half of the hinge positioning structure 20 using the first pivot shaft 262a, one of the pivot shaft grippers 264, one of the first leaves 22, and one of the second leaves 24 is described. The pivot shaft gripper 264 is sleeved on the first pivot shaft 262a in a manner such that the first end 2642 abuts the retaining ring 2624 and the second end 2644 is adjacent the outer end of the first pivot shaft 262a. Then the first pivot shaft 262a together with the pivot shaft gripper 264 is inserted into the pivot hole 226 of the first leaf 22, such that the second end 2644 of the pivot shaft gripper 264 is received in the positioning groove 228 of the first leaf 22. Thus, the second end 2644 of the pivot shaft gripper 264 is non-rotatable relative to the first leaf 22, while the pivot shaft 262 is rotatable relative to the first leaf 22. The engaging protrusions 2622 of the first pivot shaft 262a is engaged in the engaging hole 242 of the second leaf 24, such that the pivot shaft 262 is fixed to the second leaf 24. Another half of the hinge positioning structure 20 is assembled on the second pivot shaft 262b in a similar fashion with another one of the pivot shaft grippers 264 rotated 180 degrees on the second pivot shaft 262b. The two rings 2662 of the resilient member 266 are hooked to the hooks 2646 of the pair of pivot shaft grippers 264 correspondingly.

At rest, the resilient member 266 pulls the pivot shaft grippers 264 to constrict. Thus, providing a position function where the pivot shaft grippers 264 tightly grip the pivot shaft 262 such that the pivot shaft 262 is non-rotatable in the pivot shaft grippers 264. Therefore, the second leaves 24 together with the pivot shaft 262 cannot rotate relative to the first leaves 22 thus fixing a positioning of the hinge positioning structure 20.

When the hinge positioning structure 20 is to be rotated, the rings 2662 and the hooks 2646 are correspondingly pulled by an external force to extend the resilient member 266 and subsequently relaxing the pivot shaft grippers 264. Thus, the leaves 22, 24 can rotate relative to each other at the pivot shaft 262. When the leaves 22, 24 rotate to a desired position relative to each other, the external force is released, and the pivot shaft grippers 264 re-constrict around the pivot shaft 262. Therefore, the pivot shaft grippers 264 tightly grip the pivot shaft 262 again and the second leaves 24 cannot rotate relative to the first leaves 22 thus providing the positioning function.

In an alternative embodiment, the hinge positioning structure 20 may further include a lever (not shown) as an aid to apply the external force. One end of the lever is connected to one of the rings 2662 of the resilient member 266 or the first end 2642 of one of the pivot shaft grippers 264, another end of the lever extends out of the device that the hinge positioning structure 20 is applied to. Thus, the external force can be applied on the pivot shaft grippers 264 by pulling the lever.

When the pivot shaft 262 is positioned by the pivot shaft grippers 264, the second leaves 24 together with the pivot shaft 262 are not rotatable unless components of the hinge positioning structure 20 are damaged. Therefore, the second leaves 24 and the pivot shaft 262 can stably remain at any positions. When a force is applied to loosen the constriction of the pivot shaft grippers 264, the second leaves 24 can be rotated easily.

In other alternative embodiments, the pivot shaft 262 and one of the second leaves 24 can be designed to be an integral unit. The pivot shaft grippers 264 may be replaced by other pivot shaft grippers for providing a torsion force. The hinge positioning structure 20 can be applied to devices such as liquid crystal display devices. The first leaves 22 are coupled to a main body of the liquid crystal display device via a plurality of assembling holes 229, and the second leaves 24 are coupled to a screen of the liquid crystal display device via a plurality of assembling holes 244.

Figure 4:
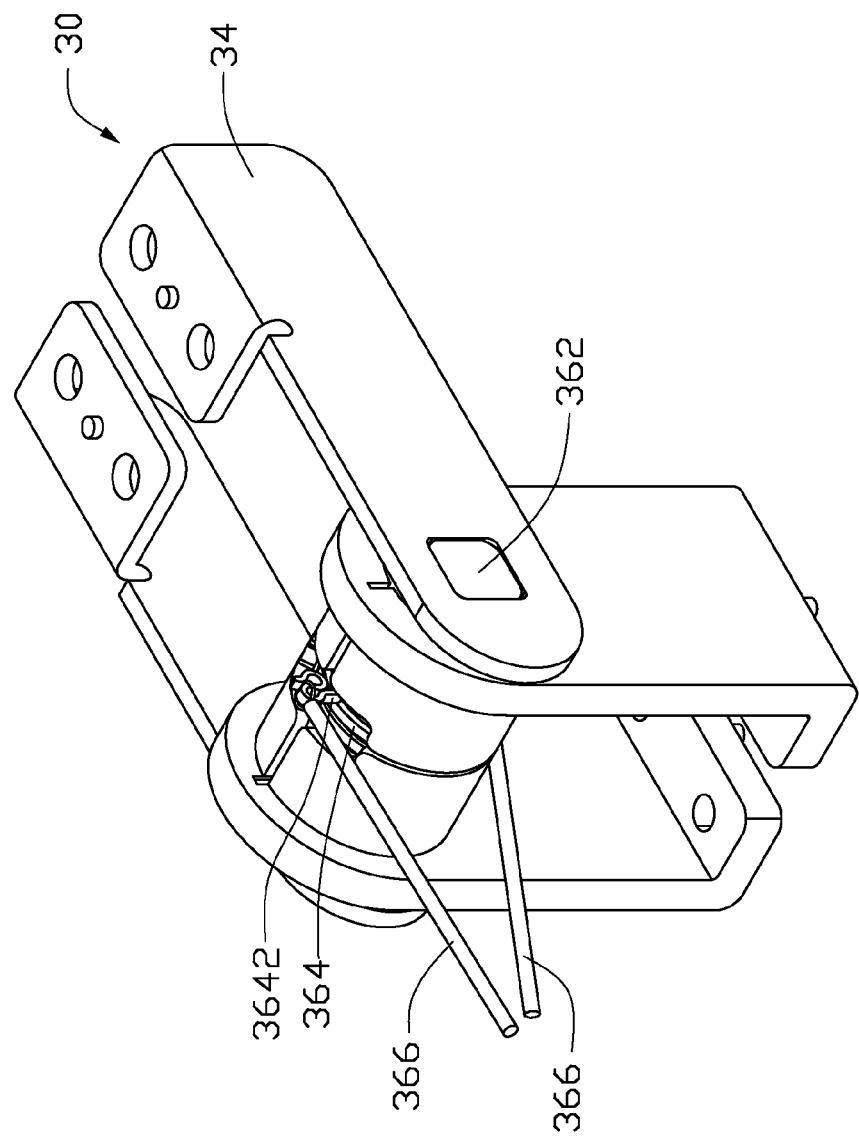
FIG. 4 is an assembled, isometric view of the hinge positioning structure in accordance with another preferred embodiment of the present invention.

Referring to FIG. 4, a hinge positioning structure 30 of another preferred embodiment is shown. The hinge positioning structure 30 is similar in principle to the hinge positioning structure 20. However, two levers 366 are used instead of the resilient member 266. One end of each of the levers 366 is connected to a first end 3642 of each of the pivot shaft grippers 364, another end of each of the levers 366 extends out of the device that the hinge positioning structure 30 is applied to. The pivot shaft grippers 364 can be tightly sleeved or relaxed sleeved on a pivot shaft 362 by controlling the levers 366, thus two second leaves 34 together with the pivot shaft 362 can be positioned or rotated.

In alternative embodiment, a diameter of the spring rings of the pair of pivot shaft grippers 364 may be designed to be smaller than that of the pivot shaft 362. The pair of pivot shaft grippers 364 is tightly sleeved on the pivot shaft 362 at first, and the pivot shaft 362 is unable to rotate. When an external force is applied on the levers 366 to make the pivot shaft grippers 364 relaxed sleeved on the pivot shaft 362, the pivot shaft 362 is rotatable.

It should be understood that, the hinge positioning unit 26 as a whole unit can be used by itself. In this embodiment, the pair of pivot shaft grippers 264 is sleeved on the pivot shaft 262, and two resilient members 266 or four levers 366 are provided. Two ends of each of the pivot shaft grippers 264 are pulled by one of the resilient members 266 or two of the levers 366, such that the pivot shaft grippers 264 tightly grip the pivot shaft 262. Therefore, the pivot shaft 262 is unable to rotate. When an external force is applied on the resilient members 266 or the levers 366 to relax the pivot shaft grippers 264, the pivot shaft 262 is rotatable. Alternatively, both the resilient members 266 and the levers 366 can be omitted. With the condition, the external force is applied on the ends of the pivot shaft grippers 264, 364 directly.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A hinge positioning structure comprising:
   a pair of first leaves;
   a pivot shaft rotatably engaged to the pair of first leaves;
   a pair of pivot shaft grippers tightly sleeved on the pivot shaft, and each pivot shaft gripper comprising a first end engaged with each of the first leaves respectively so that the end of each pivot shaft gripper is fixed relative to each of the first leaves, such that the pivot shaft is locked with the first leaves, and a pair of second leaves fixed relative to the pivot shaft;
the pair of pivot shaft grippers being relaxedly sleeved on the pivot shaft by an external force for releasing the pivot shaft and the first leaves and allowing the pivot shaft to rotate relative to the first leaves, wherein each of the second leaves is a sheet defining an engaging hole, the pivot shaft has two engaging protrusions formed at two ends thereof, a size and a shape of the engaging protrusions are corresponding to that of the engaging holes of the second leaves, and each of the two engaging protrusions is engaged in the engaging hole of each of the second leaves respectively, such that the second leaves are non-rotatable relative to the pivot shaft.

2. The hinge positioning structure as claimed in claim 1, wherein each of the pivot shaft grippers is a columnar, helical, torsional spring comprising a plurality of spring rings, a diameter of spring rings of the pivot shaft grippers is larger than that of the pivot shaft; each of the pivot shaft grippers further comprises a second end at a distal end thereof respectively.

3. The hinge positioning structure as claimed in claim 2, wherein the hinge positioning structure further comprises a resilient member, two ends of the resilient member are connected to the two first ends of the pair of pivot shaft grippers respectively, and the resilient member pulls the pivot shaft grippers to constrict so that the pivot shaft grippers tightly grip on the pivot shaft.

4. The hinge positioning structure as claimed in claim 3, wherein a hook is formed at the first end of each of the pivot shaft grippers, each end of the resilient member forms a ring, each of the two rings of the resilient member engages with the hook of each of the pivot shaft grippers respectively.

5. The hinge positioning structure as claimed in claim 3, wherein the resilient member is an extension/compression spring that can be extended and compressed.

6. The hinge positioning structure as claimed in claim 2, wherein each of the first leaves defines a positioning groove, the second end of each of the pivot shaft grippers is engaged in the positioning groove of each of the first leaves respectively, such that the second end is non-rotatable relative to the first leaves.

7. The hinge positioning structure as claimed in claim 6, wherein each of the first leaves comprises a mounting portion and a knuckle portion, the mounting portion is substantially a flat sheet, the knuckle portion is substantially a cylinder, the knuckle portion is perpendicularly connected to the mounting portion, each of the first leaves defines a circular pivot hole, and the circular pivot hole extends through the knuckle portion and the mounting portion, the pivot shaft sleeved with the pivot shaft grippers is rotatably engaged in the pivot holes of the first leaves.

8. The hinge positioning structure as claimed in claim 7, wherein the positioning groove is defined in an inner sidewall of the knuckle portion defining the pivot hole and extends along a direction perpendicular to the mounting portion.

9. The hinge positioning structure as claimed in claim 1, wherein each of the pivot shaft grippers is a columnar, helical, torsional spring comprising a plurality of spring rings, a diameter of spring rings of the pivot shaft grippers is smaller than that of the pivot shaft; each of the pivot shaft grippers further comprises a second end at a distal end thereof respectively.

10. The hinge positioning structure as claimed in claim 9, wherein the hinge positioning structure further comprising two levers, one end of each of the levers is connected to the first end of each of the pivot shaft grippers, another end of each of the levers extends out of the hinge positioning structure.

11. A hinge positioning unit comprising:
a pivot shaft; and
a pair of pivot shaft grippers sleeved on the pivot shaft from two distal ends thereof, wherein each of the pivot shaft grippers has a first end and a second end, the pivot shaft grippers are tightly or relaxedly sleeved on the pivot shaft by pulling or relaxing the first and second ends of each of the pivot shaft grippers, thus locking or unlocking the pivot shaft, the hinge positioning unit further comprises two resilient members, the first and second ends of each of the pivot shaft grippers are pulled by one of the resilient members, such that the pivot shaft grippers tightly grip on the pivot shaft.

12. The hinge positioning unit as claimed in claim 11, wherein the hinge positioning unit further comprises four levers, the first and second ends of each of the pivot shaft grippers are pulled by two of the levers, such that the pivot shaft grippers tightly grip on the pivot shaft.

13. A hinge positioning structure comprising:
a pair of first leaves;
a pivot shaft rotatably engaged to the pair of first leaves; and
a pair of pivot shaft grippers tightly sleeved on the pivot shaft, each pivot shaft gripper having a first end engaged with each of the first leaves respectively so that the end of each pivot shaft gripper is fixed relative to each of the first leaves, such that the pivot shaft is locked with the first leaves, the pair of pivot shaft grippers being relaxedly sleeved on the pivot shaft by an external force for releasing the pivot shaft and the first leaves and allowing the pivot shaft to rotate relative to the first leaves, wherein each of the pivot shaft grippers is a columnar, helical, torsional spring comprising a plurality of spring rings; a diameter of spring rings of the pivot shaft grippers is smaller than that of the pivot shaft; each of the pivot shaft grippers further comprises a second end at a distal end thereof; the hinge positioning structure further comprises two levers, one end of each of the levers is connected to the first end of each of the pivot shaft grippers, and another end of each of the levers extends out of the hinge positioning structure.

* * * * *